No. 638,374. Patented Dec. 5, 1899.
R. ARONSTEIN.
AIR CUSHION.
(Application filed Aug. 3, 1898.)
(No Model.) 2 Sheets—Sheet 1.
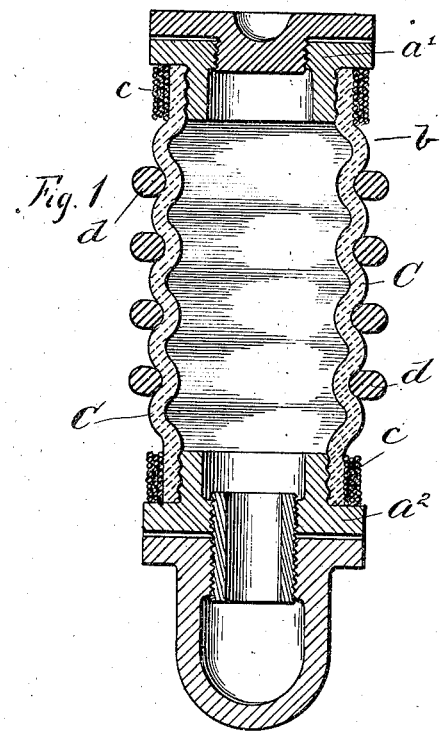
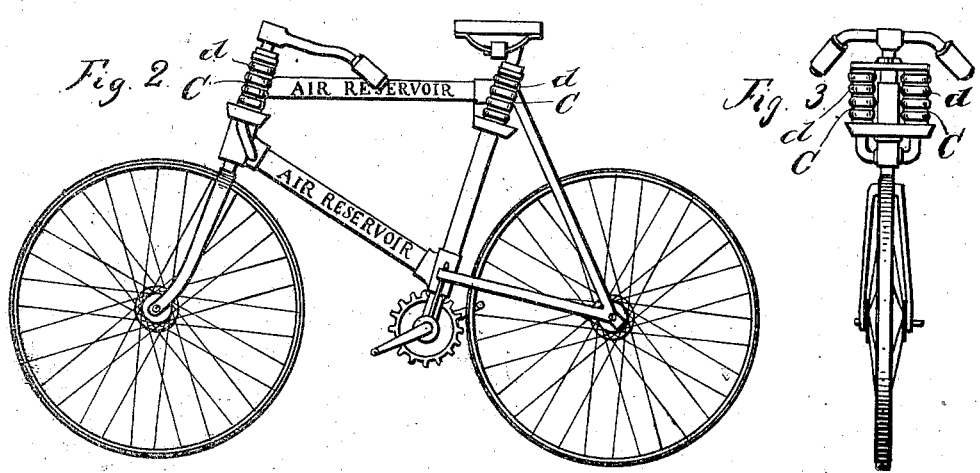
WITNESSES: INVENTOR No. 638,374. Patented Dec. 5, 1899.
R. ARONSTEIN.
AIR CUSHION.
(Application filed Aug. 3, 1898.)
(No Model.) 2 Sheets—Sheet 2.
Fig. 4.
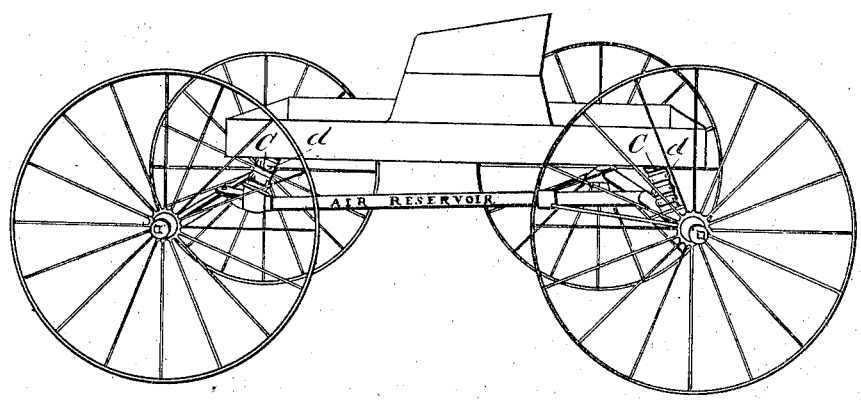
Fig. 5.
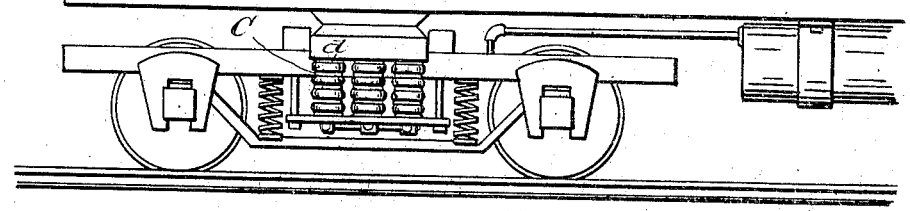
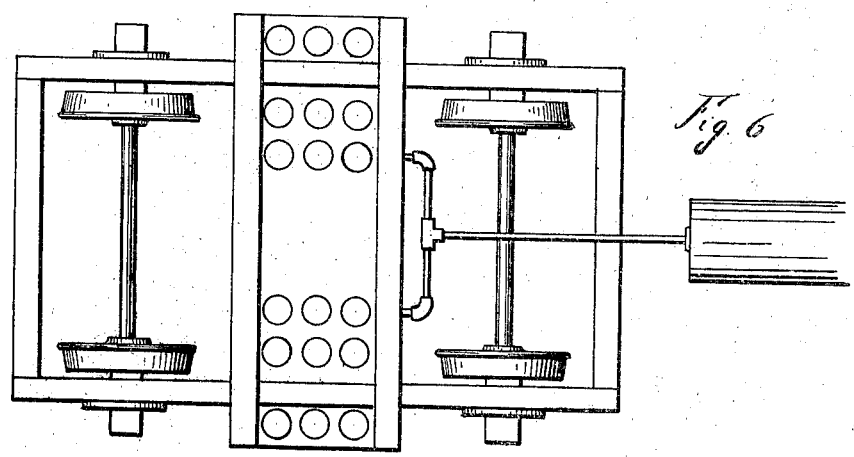
Fig. 6.
WITNESSES
INVENTOR
Richard Aronstein

UNITED STATES PATENT OFFICE.

RICHARD ARONSTEIN, OF GOLDFIELD, COLORADO.

AIR-CUSHION.

SPECIFICATION forming part of Letters Patent No. 638,374, dated December 5, 1899.

Application filed August 3, 1898. Serial No. 687,666. (No model.)

*To all whom it may concern:*

Be it known that I, RICHARD ARONSTEIN, a citizen of the United States, residing at Goldfield, in the county of Teller, State of Colorado, have invented a new and useful Improvement in Air-Cushions, of which the following is a specification.

The object of this invention is to provide all classes of wheeled vehicles with a set of air-cushions placed between the axle of the wheel and the seat for the purpose of cushioning off the shocks caused by the unevenness of the road.

The invention is illustrated on the drawings, in which—

Figure 1 shows a perpendicular cross-section through one of its air-cushions. Figs. 2 and 3 show a bicycle; Fig. 4, a carriage. Figs. 5 and 6 show a railroad-car, each being provided with a set of these air-cushions.

As shown in Fig. 1, the cushion is in the form of a cylinder, with metallic cylinder-heads marked $a'$ $a^2$, to which is cemented a corrugated rubber mantle $b$, which rubber mantle is permanently and air-tightly fastened to the cylinder-heads through the wire bands $c$ $c$, the metallic bands $d$ $d$ encircling the rubber mantle at the grooves. The manufacture of this cylinder requires the use of a sectional extractable core and an outer mold for the vulcanization. The metallic stiffeners $d$ $d$ prevent the mantle from spreading in width under the pressure of the compressed air, which therefore exerts all its force of expansion in raising the load on the cylinder-head.

Figs. 2 and 3 show a bicycle with solid tires provided with a set of these air-cushions, giving to the rider the full cushioning effect of the pneumatic tire without the many drawbacks of the latter.

Fig. 4 shows a carriage supplied with a number of these air-cushions in the place of springs.

Figs. 5 and 6 show the truck of a railroad-car, the air-cushions being mounted in the bolsters of the truck.

The many advantages of this cushioning system above the pneumatic tire are obvious. It takes the air-cushion from the tire of the wheel, the most vulnerable point of the vehicle, as being in constant friction with the road, and puts it on the safest possible place. It reduces the size of the rubber mantle and its unavoidable escape of air through the pores of the rubber to the smallest possible size, thus causing it to hold its air charge much longer, and it gives a greater cushioning effect than the pneumatic tire, as the reach between its extreme points of compression and expansion is much wider than that of the pneumatic tire.

I therefore claim as new and desire to secure by Letters Patent—

In a wheeled vehicle, air-cushions in the form of air-cylinders with corrugated rubber mantles, which are fastened to metallic cylinder-heads through rings of wire winding, and with metallic rings encircling the grooves of the rubber mantle.

RICHARD ARONSTEIN.

Witnesses:
 HERMANN LEON,
 FRANK A. LEON.